Jan. 13, 1931.  E. GRANAT  1,788,670
DISTANT ELECTRIC CONTROL DEVICE
Filed Oct. 19, 1928  11 Sheets-Sheet 3
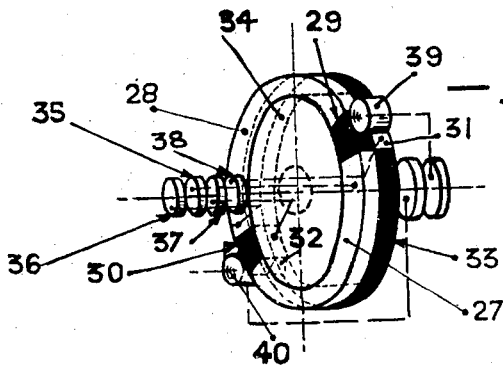
FIGURE 2
FIGURE 3
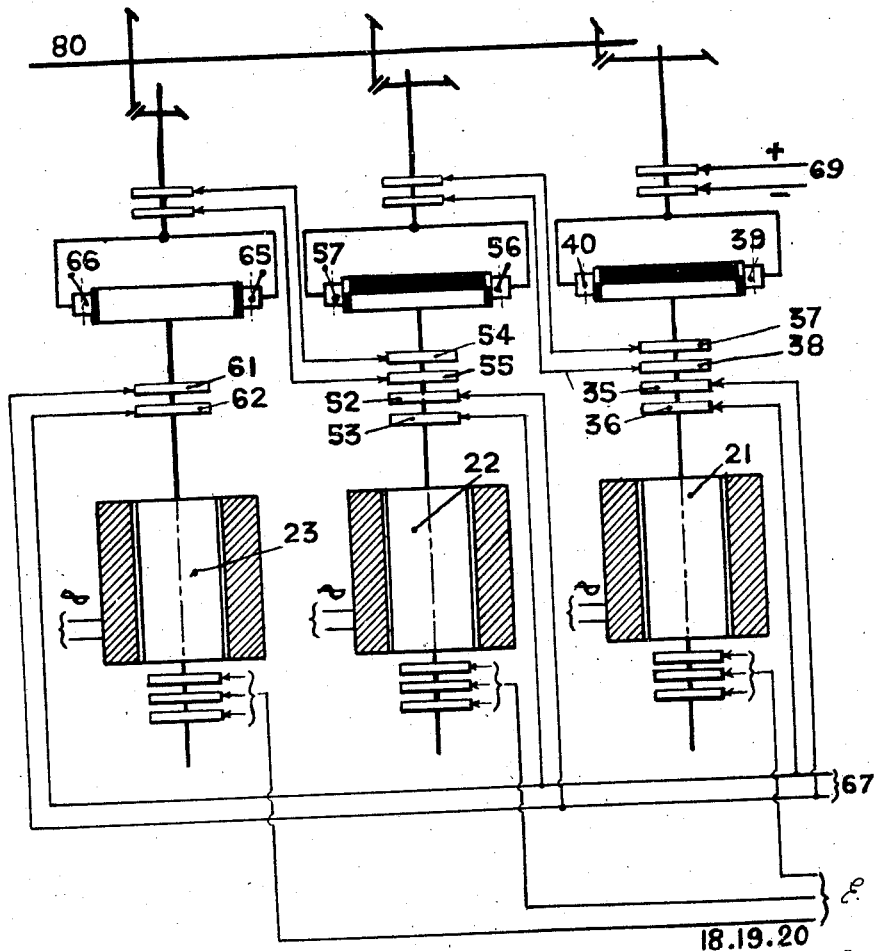

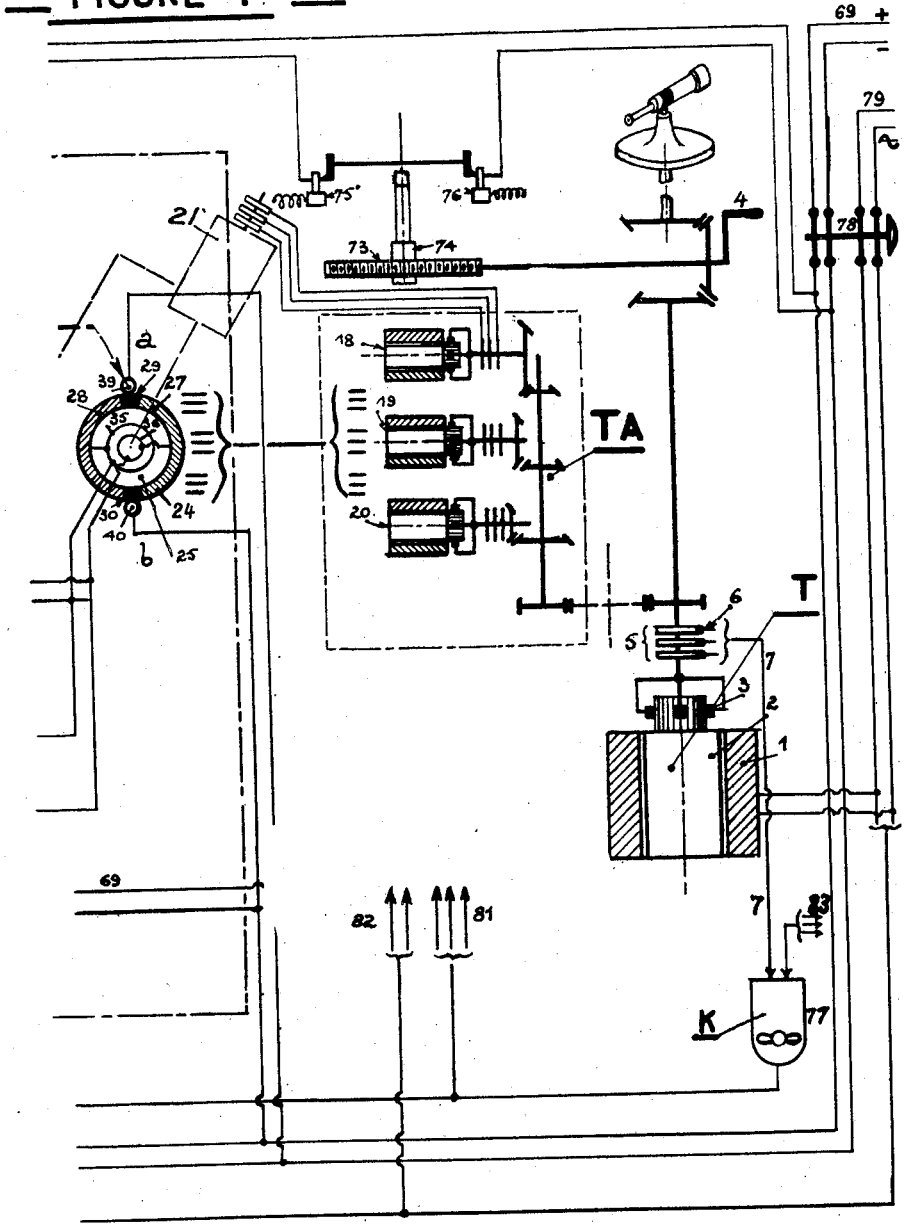

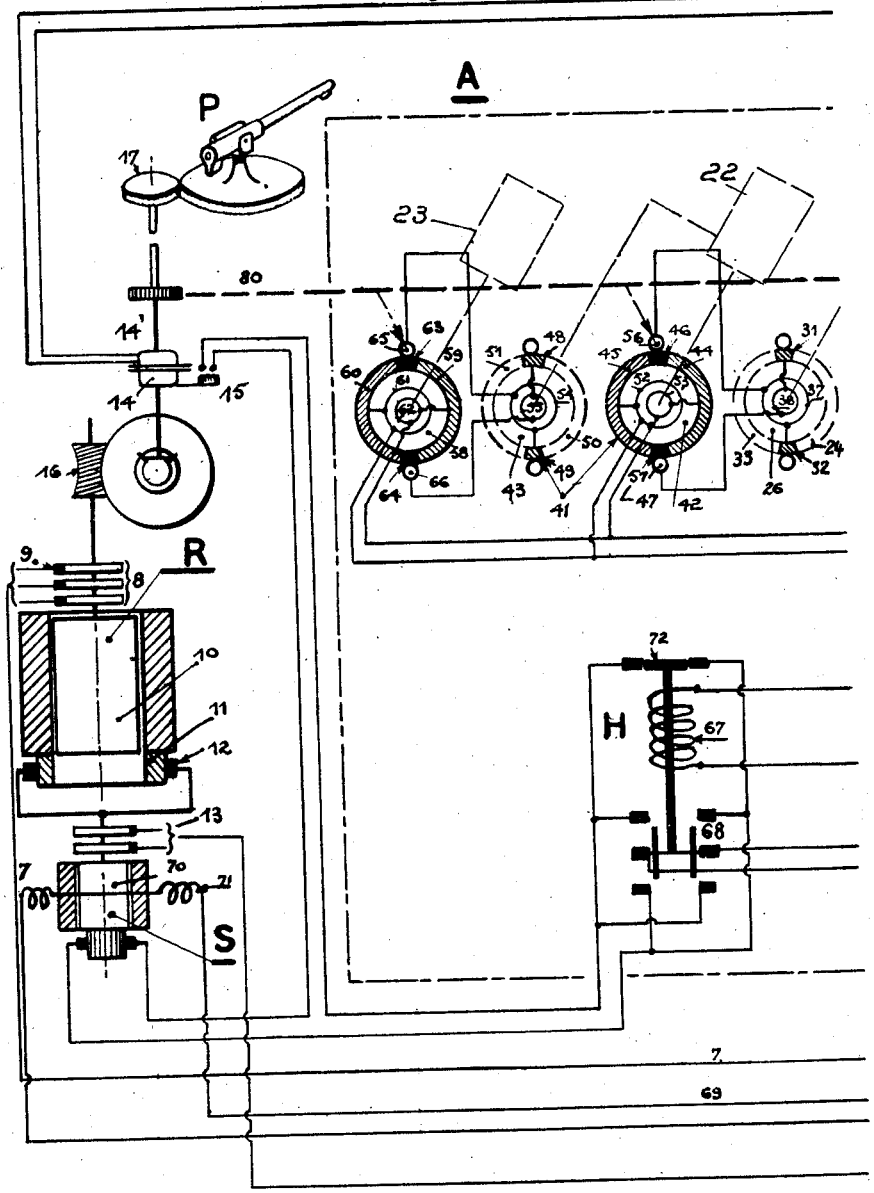

Jan. 13, 1931.                E. GRANAT                1,788,670
                    DISTANT ELECTRIC CONTROL DEVICE
                Filed Oct. 19, 1928        11 Sheets-Sheet 4

Jan. 13, 1931.  E. GRANAT  1,788,670
DISTANT ELECTRIC CONTROL DEVICE
Filed Oct. 19, 1928    11 Sheets-Sheet 5

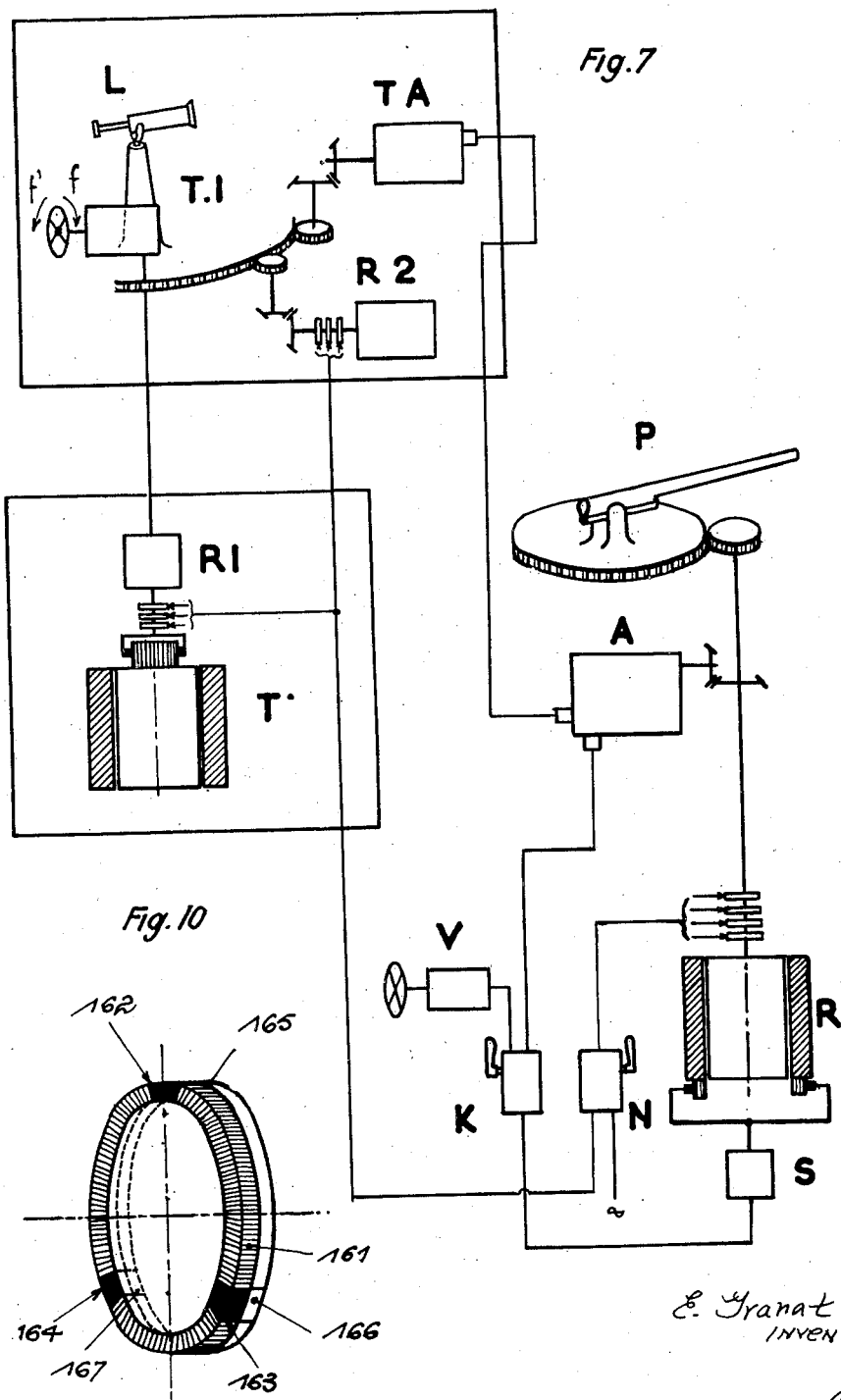

Jan. 13, 1931.   E. GRANAT   1,788,670
DISTANT ELECTRIC CONTROL DEVICE
Filed Oct. 19, 1928   11 Sheets-Sheet 7
Fig.9
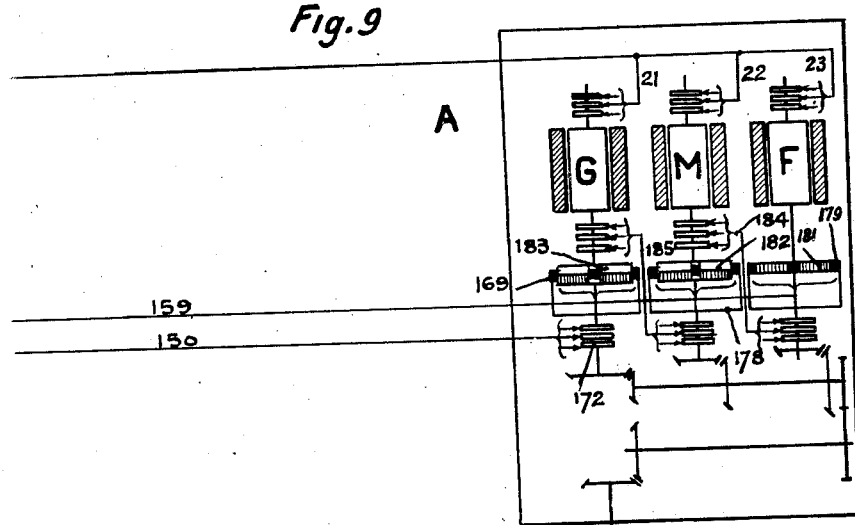
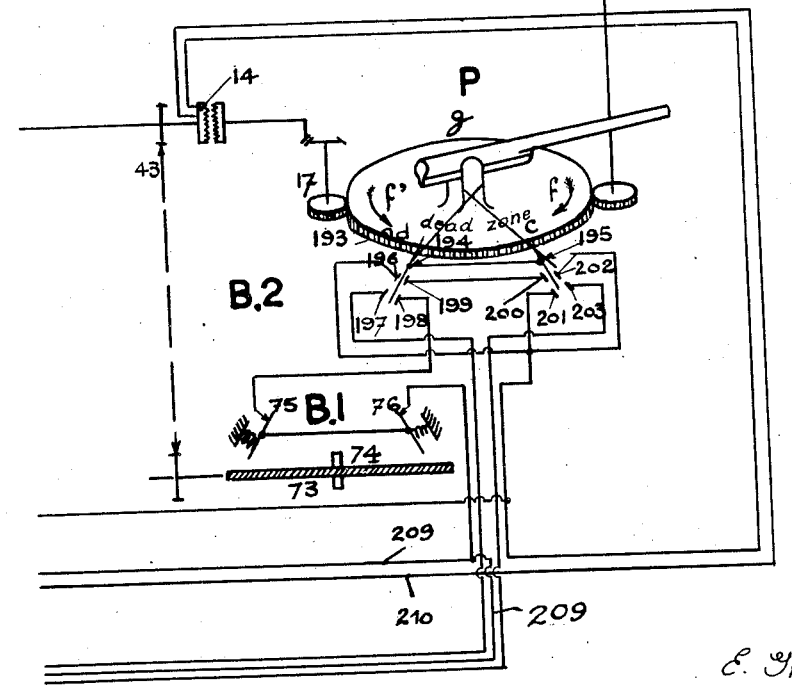

Jan. 13, 1931. E. GRANAT 1,788,670
DISTANT ELECTRIC CONTROL DEVICE
Filed Oct. 19, 1928 11 Sheets-Sheet 8

E. Granat
INVENTOR

By Marks & Clerk
ATTYS.

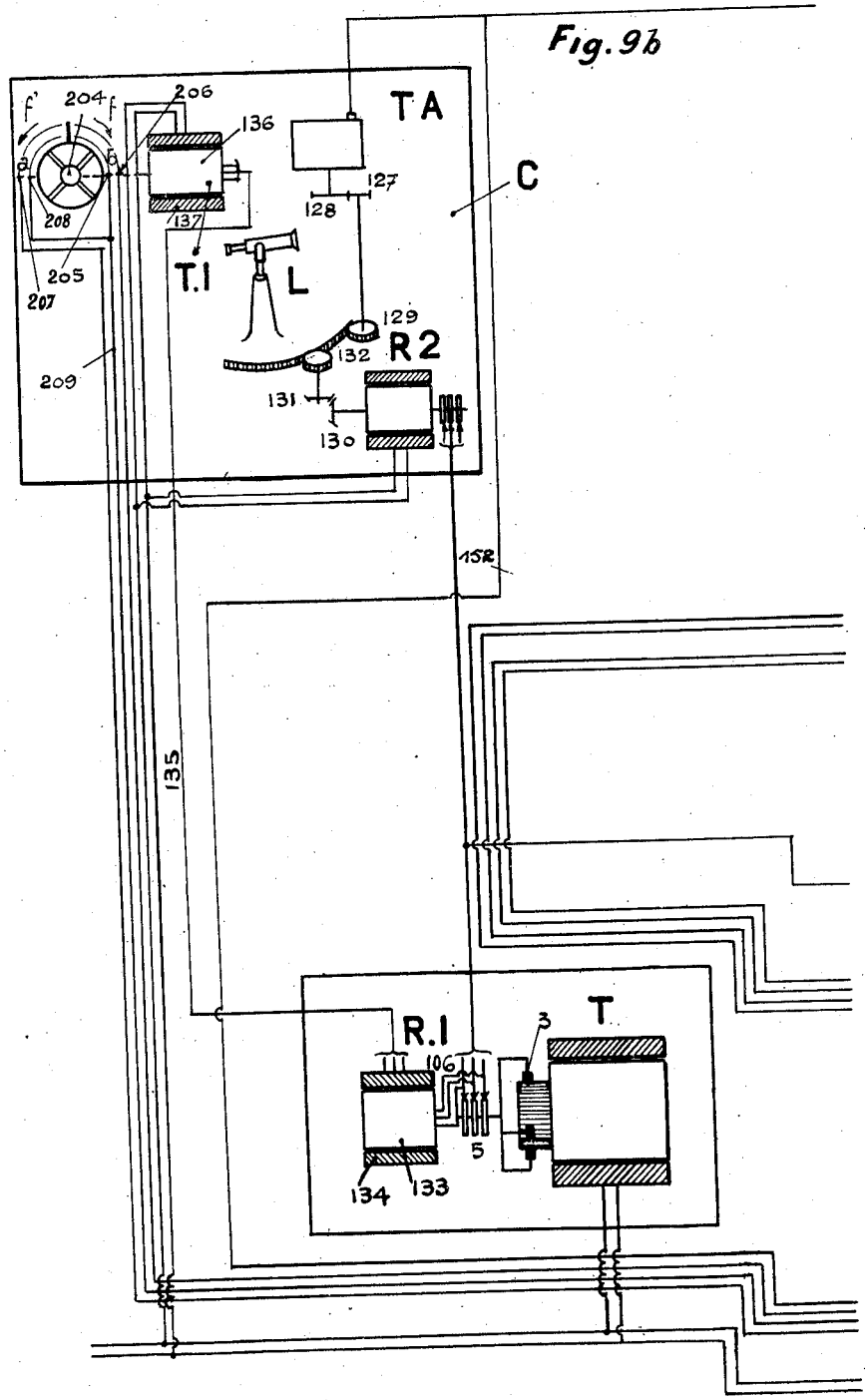

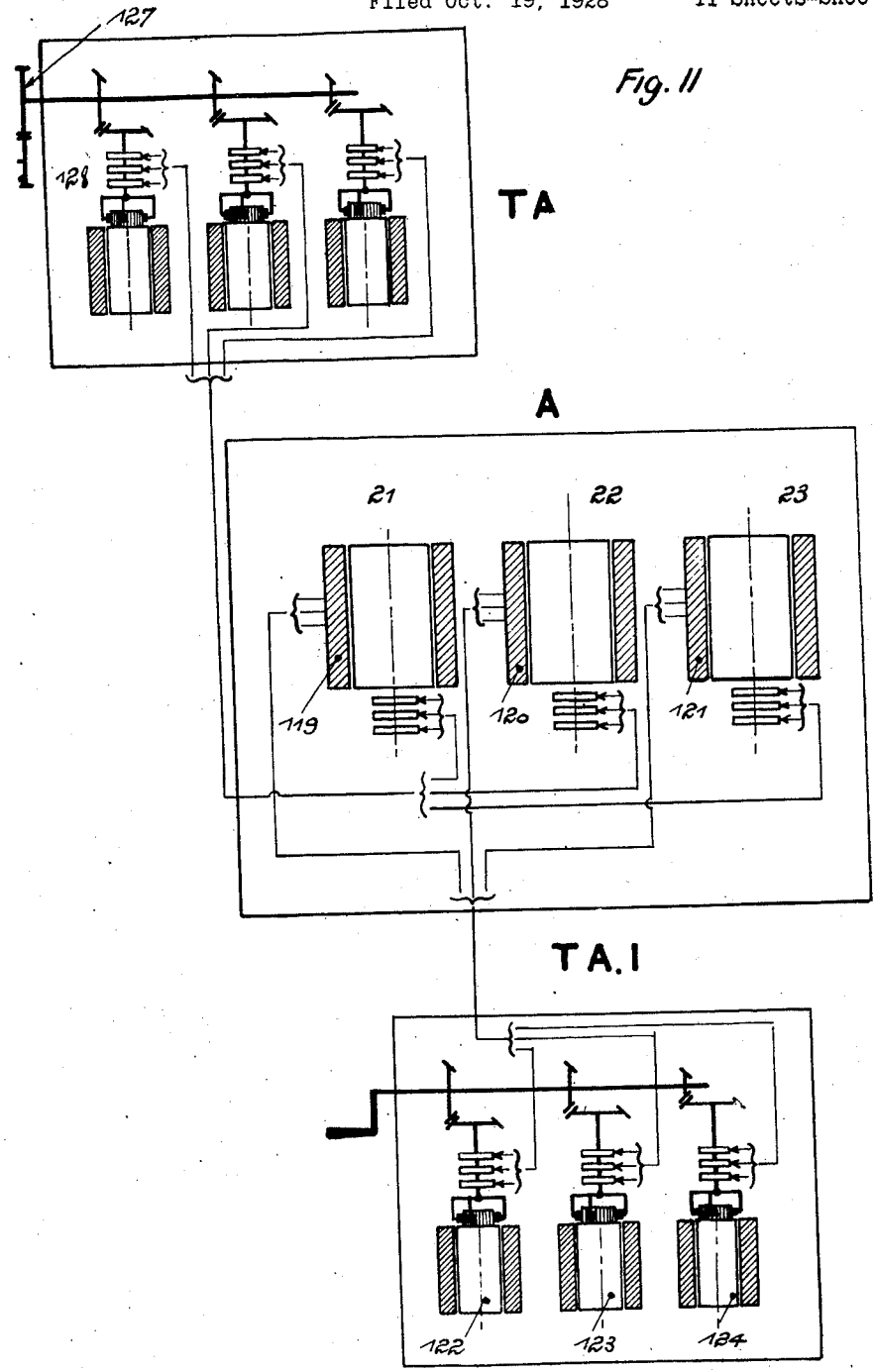

Jan. 13, 1931.   E. GRANAT   1,788,670
DISTANT ELECTRIC CONTROL DEVICE
Filed Oct. 19, 1928   11 Sheets-Sheet 11
Fig. 12
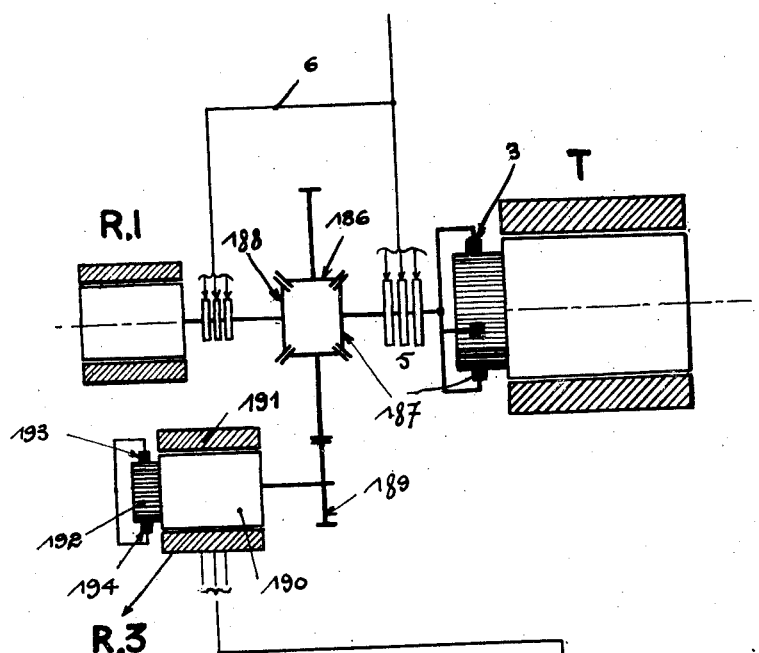
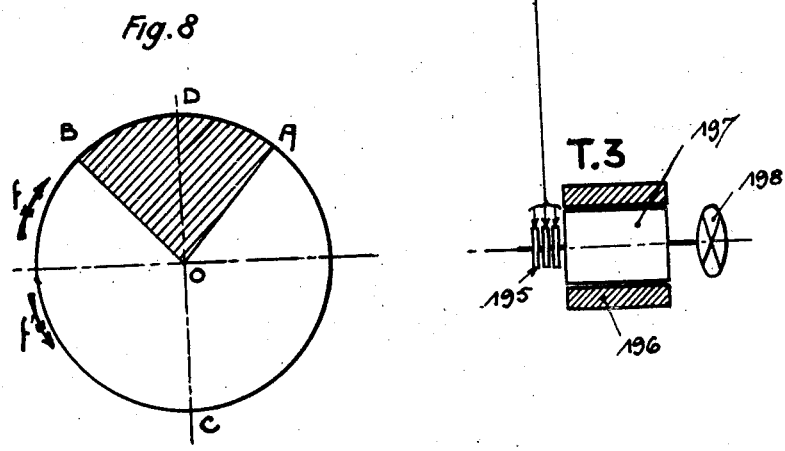
E. Granat
INVENTOR
By Marks & Clerk
ATTYS.

Patented Jan. 13, 1931

1,788,670

UNITED STATES PATENT OFFICE

ELIE GRANAT, OF PARIS, FRANCE, ASSIGNOR OF ONE-HALF TO COMPAGNIE DES FORGES ET ACIERIES DE LA MARINE ET D'HOMECOURT, OF PARIS, FRANCE, A COMPANY OF FRANCE

DISTANT ELECTRIC CONTROL DEVICE

Application filed October 19, 1928, Serial No. 313,615, and in France November 16, 1927.

Most of the known distant electric control devices show the drawback that the receivers may be shifted with reference to the transmitter. My invention has for its object to set automatically the receivers into concordance with the transmitter or transmitters whenever they have been shifted with reference thereto, for instance after an interruption in the electric supply. I provide thus for the automatic concordance between the different stations as soon as the electric circuits are closed. Thereby several transmitters may be used which are connected in succession with the receivers by means of a switch. Moreover the lag due to the falling out of step through an abnormal resistance (such as lack of current, a bad contact and the like) will be corrected as soon as its cause will have disappeared, as the receiver will automatically return into concordance with the transmitter.

My invention may be applied to any kind of distant electric control device.

I will describe now, merely by way of example, a firing plant comprising a main and an auxiliary control station, and a number of firing stations.

Figs. 1 to 3 relate to a first form of execution.

Fig. 7 shows a simplified form of execution.

Figure 4:
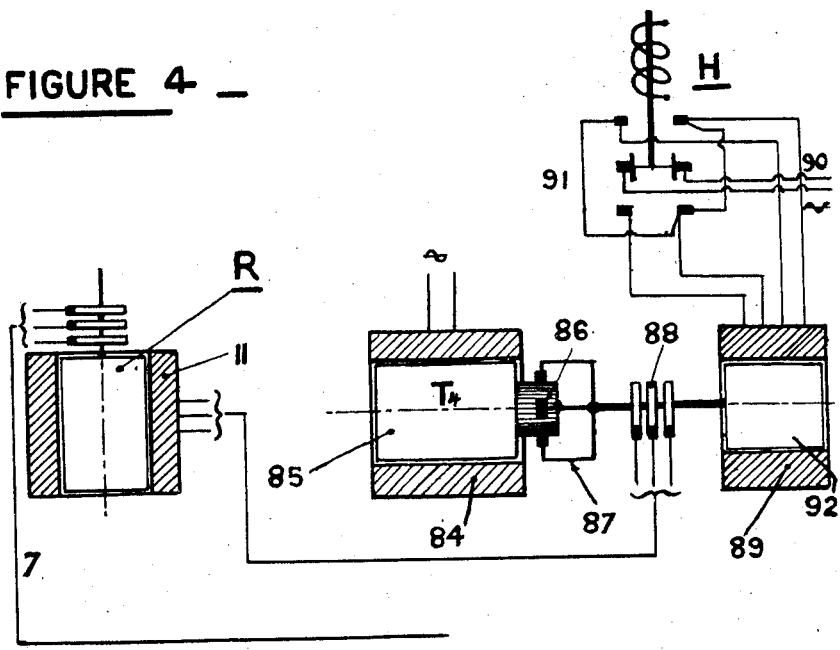
Figs. 4 and 5 illustrate a modification thereof.

Figs. 8 to 12 relate to a last form of execution.

I will suppose, always by way of example the plant is similar to that described in my co-pending application Ser. No. 142,448.

As shown on Fig. 1 the static transmitter T comprises a stator 1 fed with one-phase current and a stationary armature 2 the winding of which is connected with a commutator round which moves a set of three brushes 3 controlled by the handwheel 4. The brushes 3 are connected with three rings 5 against which the stationary brushes 6 connected with the transmission wires are adapted to bear.

Each receiver comprises a controlled receiver having a stator with a distributed winding and a commutator 11 fed with one-phase current through the rings 13 and the two brushes 12 and a rotor 10 with three rings 8 connected with the transmission wires 7 through the brushes 9.

This rotor controls the gun P through a magnetic coupling 14 and a suitable transmission such as a worm gear 16—17.

As explained in my abovementioned prior specification, the brushes 3 when rotating round the transmitter commutator causes the receiver rotor to rotate by a proportional or equal angle. The brushes 12 when rotating round the stationary commutator of the receiver cause a complementary rotation of the rotor by a proportional or equal angle. The gun is thus rotated independently of the distant control device. Thereby it is possible during the working of the latter, to bring individual corrections at the several receiving stations without disturbing the working of the distant control device.

Consequently any shifting of the receiver with reference to the transmitter caused for instance by a falling out of step or a momentary stoppage in the current supply, may be corrected by a suitable shifting of the set of two movable brushes 12 feeding the one phase current.

This movement may be executed either by hand at the receiving station as required by the signalling and control apparatuses or else automatically by an auxiliary motor actuating the set of brushes 12.

Now according to my invention this auxiliary motor may be automatically set rotating in the proper direction and stopped after the proper shifting has been operated.

In view of this, I provide an auxiliary transmitter TA comprising three small independent transmitters which may be for instance of the same type as the main transmitter T. The sets of movable brushes of these transmitters are mechanically coupled together and with the control crank through a gearwork in a manner such for instance that to each rotation of the main transmitter will correspond a rotation of one half, 6 and 60 revolutions for the transmitters 18, 19 and 20 respectively.

The automatic concordance restoring device at each receiver comprises:

a—Three auxiliary receivers 21, 22, 23 as shown diagrammatically on Fig. 1. Each receiver is fed through the corresponding auxiliary transmitter of the transmitting control station. The shaft of each auxiliary receiver is provided with a cylindrical distributor 24, 41 or 58 to be described hereinafter and shown on Figs. 1, 1a, 2 and 3.

b—A relay H controlling the reversing switch 68.

c—An auxiliary motor S the armature 70 of which is fed through 69, the reversing switch 68 and the switch 15 which allows current to flow through S only when the coupling 14 is operative.

I will suppose the receivers 21, 22, 23 are fed respectively by the transmitters 18, 19 and 20.

The shafts of the receivers 21 and 22 bear similar distributors 24 and 41 respectively. These distributors comprise—each two contact bearing plates having the same diameter and round which two diametrically opposite rubbing parts such as rollers bearing against both plates are adapted to move.

On Figs. 1 and 1a the two distributor plates are shown apart in order to make the diagram appear clearer. Fig. 2 is a perspective view of the whole distributor and Fig. 3 is a more detailed view of the distributor, rollers and parts actuating them.

The distributor 24 comprises two contact-bearing plates 25 and 26. The first plate 25 is provided at its periphery with two semicylindrical conducting parts 27 and 28 separated by two small insulating parts 29 and 30. The second plate 26 is provided with two contacts 31 and 32 separated by two semicylindrical insulating parts 33 and 34. The insulating parts are preponderating and correspond to the conducting parts of the first plate. Similarly the contacts 31 and 32 correspond to the insulating parts 29 and 30 of the first plate.

The contacts 27 and 28 are connected with the rings 35 and 36 and the contacts 31 and 32 with the rings 37 and 38.

The set of diametrically opposed rollers 39 and 40 may move round the distributor as will be described hereinafter.

The distributor of the receiver 22 is identical with that of the receiver 21 and comprises the rollers 56—57.

The distributor of the receiver 23 comprises only one plate 58 provided with semicylindrical contacts 59 and 60 connected with the rings 61 and 62. The semicylindrical contacts 59 and 60 are separated by the insulating parts 63 and 64.

A set of diametrically opposed rollers 65 and 66 is adapted to move round the distributor.

The movement of these rollers round the distributor plates 24, 41 and 58 is provided as follows.

The controlled device (ordnance in the example shown) comprises a mechanical transmission 80 controlling the three sets of rollers 39—40, 56—57 and 65—66.

The gear ratio between the different sets of brushes and the ordnance is such that (in the example shown corresponding to the transmitter 18, 19 and 20 having the above-mentioned gear relation) for each revolution of the controlled device the three sets of rollers (39—40, 56—57 and 65—66) rotate respectively by one half, six and sixty revolutions.

The distributors feed the relay H controlling the reversing switch 68 connected with the D. C. wires 69 and the movement of which in a given direction causes the auxiliary motor S to start, said motor having its field winding 71 fed through the wires 69.

The feeding of the relay H by the different distributors is provided in the following manner.

The rollers 39 and 40 are alone fed directly by the mains and provide when they are rubbing on the conducting parts 27 and 28 the feeding of the relay through the rings 35, 36. When these rollers are in coincidence with the contacts 31 and 32, they feed on the contrary through the rings 37 and 38, the rollers 56 and 57 of the distributor 41 of the next receiver 22, whereby the relay H is fed through the rings 52 and 53.

Similarly when the rollers 56 and 57 of the distributor 41 of the receiver 22 are in contact with the conducting segments 48 and 49 the rollers 65 and 66 of the distributor of the last receiver are fed by the mains and therefore the relay H is fed through the rings 61 and 62.

The magnitude of the total rotation of the ordnance P as limited by its firing zone is determined by the travel of the nut 74 over the screw 73 between the stops 75 and 76, the current controlling the coupling 14 being switched off as soon as the nut comes against its stops, that is as soon as the ordnance is at the end of its firing zone.

The crank 4 controls one or more screws such as 73 in order to move as many nuts as there are guns having different firing zones, each nut controlling a couple of switches such as 75 and 76 disposed in series with the winding controlling the magnetic coupling of the gun or guns considered.

The working of the arrangement is as follows:

We will suppose first the transmitter and the gun are in concordance. In this case, the relative arrangement of the parts is such that the sets of rollers 39—40, 56—57 and 65—66 moving with the gun are in contact with the insulating segments 29—30, 46—47 and 63—64 of the distributors as shown on Figs. 1, 2 and 3. The relay H is therefore not fed and the auxiliary motor S remains stationary.

Now if the crank 4 is controlled at the transmitting station, the movement of the brushes 3 of the transmitter provides.

1°.—For the control of the movement of the receiver R and thereby of the part P which controls in its turn the sets of rollers 39—40, 56—57 and 65—66.

2°.—For the actuation of the sets of movable brushes of the transmitters 18, 19 and 20.

Therefore the position of the receivers 21, 22 and 23 corresponds exactly to that of the sets of brushes of the auxiliary transmitters 18, 19 and 20.

Consequently, when the distant control device works normally, the rollers which due to their mechanical connections, have the same absolute and relative speeds as the sets of brushes of the transmitters 18, 19 and 20, keep the same relative position with reference to their distributors. They remain therefore in contact with the insulating segments of the first plate of each distributor, and the relay H is not fed.

If we suppose now the gun is shifted with reference to the crank 4 of the control station, the rollers will change their position on the distributors. In no case however the rollers 39 and 40 can move by more than one half revolution from the original position of equilibrium as shown on Fig. 1. Consequently, according to the magnitude of the lag, the axes of the pairs of rollers will move by a certain amount on one side or the other of the axis $a-b$ of the insulating segments. The relay H will thus be fed with a given polarity and the motor S will start in a direction such that it will make the brushes 12 of the main receiver rotate and therewith the rotor 10 and the gun so as to compensate for the shifting. The distributor acts thus as a reversing switch.

As the receiver returns towards concordance, the shifting of the rollers with reference to their position of equilibrium decreases until the rollers 39 and 40 come into contact with the insulating parts 29 and 30. Now, at this moment, the said rollers feed the next distributor 41 through the contacts 31 and 32, the rings 37 and 38 and the rollers 56 and 57.

The speed relationship between the different sets of rollers and the size of the insulating segments, beyond the above stated ratio, have been chosen such that when the set of rollers 39—40 comes into contact with the insulating parts 29 and 30, the rollers 56 and 57 have less than one half revolution to execute whilst the rollers 39 and 40 travel over the half width of the insulating parts and return to their position of equilibrium.

Therefore the feeding of the relay will be continued with the same polarity through the second distributor, and the auxiliary motors will continue returning the gun to its proper position.

As soon as the rollers 56 and 57 come into contact with the insulating parts 46 and 47, they feed in their turn through the contacts 48 and 49 and the rings 54 and 55, the rollers 65 and 66 of the distributor 58.

The speed demultiplying ratio between the sets of rollers and the size of the distributor parts are also in this case such that the rollers 65 and 66 rotate by less than one half circumference whilst the rollers are travelling over half the width of the insulating segments 46 and 47 in order to reach their position of equilibrium shown on the figure.

The relay H is thus fed finally through the distributor 58.

When the receiver is again in concordance with the transmitter, the rollers 65 and 66 are no longer in contact with the parts 59 and 60 whereby the relay H is no longer fed nor consequently the auxiliary motors. At the same moment, the contact 72 controlled by H short circuits the motor armature whereby the stopping is made much more sudden.

It should be noted that the abovedescribed method allows the concordance to be restored by means of three stages of increasing accuracy; any desired accuracy can therefore be obtained by suitably choosing the number of these stages of adjustment.

On the other hand, by giving the contacts such as 31 and 32 a width slightly above that of the insulating parts such as 29 and 30 in the two first distributors, the relay H may be fed during a short moment by two distributors in parallel, whereby rupture sparks are avoided between the rollers and the distributors when the rollers leave the conducting parts 27 28 or 44 45. Although the distributors become operative in succession the current is finally broken off only on the last distributor the speed of which is the greatest.

In a word, my automatic concordance restoring device works through the mere closing of the double switch 78 closing the one-phase and direct current circuits.

My improved device comprises a series of parts (auxiliary transmitters and receivers, distributors and rollers) acting finally on a single part (a relay in the case illustrated) which drives the part restoring the concordance between the controlled and controlling parts.

The same device may be used with other means for restoring the concordance such as an electric rotation of the inducing field of the receiver R instead of a mechanical rotation.

In this case, the relay H instead of controlling the switch controlling the starting of the auxiliary motor S would control the controlling part of a three phase transmitter having a variable frequency such as the one described in my copending application Ser. No. 166,801.

Figure 5:
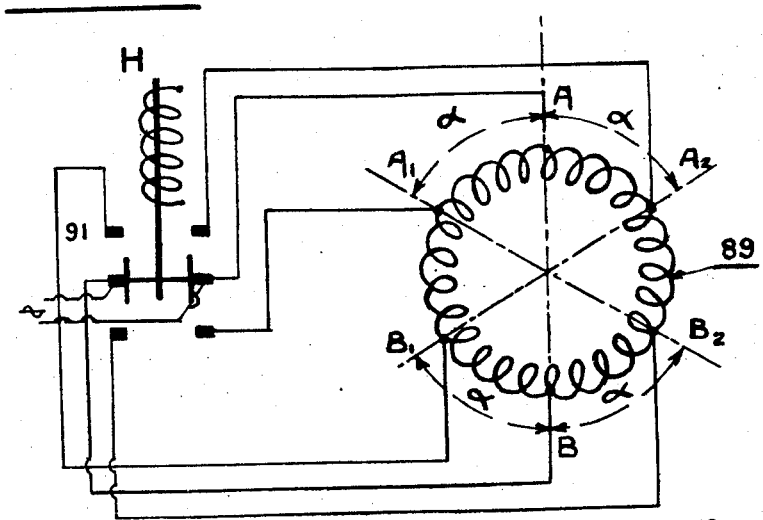

Figs. 4 and 5 show a modified form of the arrangement disclosed in the last mentioned specification, as adapted for applying my present invention. The shifting of the fields instead of being obtained mechanically through a differential is obtained electrically through the modification of the feeding points of the distributed winding of one of the transmitters or receivers described in the said specification.

In the device shown on Fig. 4, the relay H acts on the alternating inducing field of the receiver R of the type described hereinabove through.

$a$.—A transmitter $T_4$ similar to the transmitter T described hereinabove and comprising a stator 84 and a stationary armature 85 having a commutator 86 round which three movable brushes 87 connected with the rings 88 are adapted to move.

$b$.—A receiver similar to receiver R and comprising a stator with a distributed winding 89 fed from the one-phase mains through the reversing switch 91 and a rotor 92 provided with a three phase winding connected with the rings 88. The said rotor drives the brushes 87.

The manner of feeding the distributed winding of the stator 89 is shown on Fig. 5. A B being the direction of the alternating inducing field of the receiver when the system is in equilibrium, said direction corresponding to that of the rotor, the reversing switch allows the stator to be fed either through $A_1$, $B_1$, or through $A_2$ $B_2$, $A_1$ $B_1$, and $A_2$ $B_2$ making the same angle $\alpha'$ with the direction A B corresponding to equilibrium.

The working of the system is as follows:

When the gun is angularly shifted with reference to the main transmitter T, the value of this shifting will be given out by the distributors 21, 22, 23 which actuate the reversing switch which in its turn provides for the feeding of the winding 89 of the auxiliary receiver to be made through $A_1$ $B_1$ or $A_2$ $B_2$ according to the direction of the shifting of the gun. The reversing switch 91 may moreover be disposed so as to provide the feeding through points A and B when the gun and transmitter are in concordance which corresponds to the position of equilibrium of the arrangement shown on Fig. 4.

On the other hand when any shifting appears between the controlling and controlled parts, the result is, as explained above, a displacement of relay H, which causes a shifting by an angle=$\alpha$ in a given direction of the inducing field of the stator 89 with reference to the line AB.

The shifting $\alpha$ between the fields of the stator 89 and of the rotor 92 gives birth to a torque causing the rotor to rotate in a given direction which will have a tendency to remove the shifting as explained in my prior specification.

The mechanical connection between the rotor 92 and the brushes 87 causes the field of rotor 92 to rotate due to the rotation of the brushes 87 feeding the rotor.

Therefore the shifting by $\alpha$ of the stator field 89 with reference to the field of the rotor 92 keeps a constant value; consequently the rotor 92 continues rotating with the brushes 87 at a speed which depends on the angle $\alpha$.

Now if the distributed winding of the stator 11 of the receiver R is fed through the three rings 88, the alternating inducing field of this stator will rotate and its frequency is proportional to the speed of rotation of the brushes 87. The case is similar to that of Fig. 1 with the difference that the rotation of the inducing field is obtained electrically instead of being obtained mechanically through the auxiliary motor S.

Of course when the concordance is restored, the relay H returns to its position of equilibrium and the receiver rotor 92 ceases rotating and so does the set of brushes 87. The direction of the alternating inducing field of the stator 11 of the receiver is therefore stationary in space.

It should be noted the relay H might instead of controlling the reversing switch 91 control the planet pinions of a differential gear such as the one shown on Fig. 1 of my prior specification. On the other hand instead of feeding the stator 89, the reversing switch might feed the stator 84.

Lastly one of the stators with a distributed winding 84 or 89 may be provided with a commutator on which a set of two feeding brushes controlled by the relay H would be adapted to rub.

Figure 6:
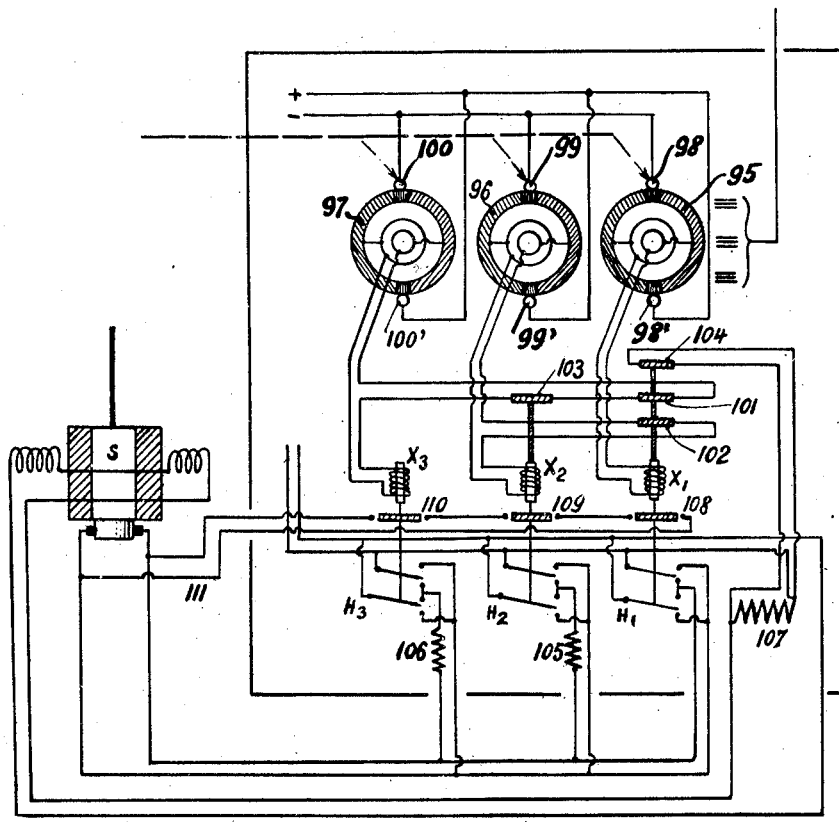
Fig. 6 shows another modification.

Fig. 6 shows a modified form of the distributors shown on Fig. 1. They are no longer fed in series but in paralllel and control one after the other a corresponding relay closing the circuit of the auxiliary motor. In this case, the distributors 95, 96, 97 comprise, like the distributor 58 of Fig. 1 only one plate consisting of two semi-cylindrical conducting parts connected with rings and separated by insulating blades.

Rubbing parts or rollers 98, 98', 99, 99', 100, 100' the rotation of which under the action of the gun or similar part P is normally synchronous with that of the receivers (not shown) controlling the distributors are connected permanently in parallel with the D. C. supply. Thus the relays $X_1$, $X_2$, $X_3$ connected with the rings of each distributor are fed with D. C. as soon as the corresponding distributor rollers pass off the insulating blades. At this moment the relay considered acts on one of the reversing switches $H_1$, $H_2$, $H_3$ connected with the mains, which switch closes the circuit of the auxiliary motor S. The latter rotates in the desired direction as explained with reference to the devices shown on Fig. 1 and Fig. 1a. The speed ratios between the rotations of the distributors are similarly chosen as for the said devices, with a view to obtain increasing accuracies with the successive use of the distributors 95, 96, 97. The width of the insulating part is determined as explained with reference to Fig. 1. The distributors act selectively as in the case of Fig. 1 and in the proper order as soon as any shifting occurs. In view of this it is important to prevent several relays from being fed simultaneously. Therefore each distributor controls the opening of contacts disposed in the circuit of the relays fed by the distributors rotating at a higher speed. Thus the relay $X_1$ when fed by the distributor 95 causes the opening of the contacts 101 and 102 inserted respectively in the circuit of the relays $X_2$ and $X_3$. Similarly when the rollers 98, 98' are returned into contact with their insulating blades and the contacts 101 and 102 are consequently closed, the rollers 99, 99' cause the circuit of $X_2$ to close whereby the circuit of $X_3$ is prevented closing through the opening of the contact 103 in series with 101 in the said circuit of $X_3$. Thus only one of the relays $X_1$, $X_2$, $X_3$ can be fed at a given moment. Through the use of different reversing switches for the different distributors it is possible to give the auxiliary motor S decreasing speeds for increasing accuracies and it can be stopped speedily when the receiver is set back into concordance. In view of this, I may dispose in the induced or in the inducing field of the motor S or in both fields resistances which are short circuited or inserted in the circuit, according to the case, when one or the other relay is operative. For instance, as shown on Fig. 6, the contact 104 short circuits the resistance 107 of the exciting circuit of S. This contact being opened at the same time as 101 and 102 by the relay $X_1$, the speed of rotation of the auxiliary motor will be the greatest. On the other hand the resistances 105 and 106 are inserted, under the action of the reversing switches $X_2$ and $X_3$ respectively, in the circuit of the armature of S and their size is such that the speed of the auxiliary motor decreases when it is fed by the switches $H_2$ and $H_3$.

Lastly contacts 108, 109, 110 controlled respectively by the relays $X_1$ $X_2$ $X_3$ are inserted shuntwise in a short circuit of the armature of the auxiliary motor. Thus when the distributors have been brought in succession to their inoperative position, the three contacts 108, 109, 110 are all closed and the short circuit 111 is operative whereby the armature is short circuited and the auxiliary motor is speedily stopped as soon as concordance is restored.

The several automatic devices for ensuring the concordance between the receiver and transmitter described hereinabove, allow also the main transmitter T to be replaced by one or more secondary transmitters such as 83 through the action of the switch K (Fig. 1).

Each secondary transmitting station comprises obviously a series of auxiliary transmitters T A which are made operative together with the corresponding main secondary transmitter by the switch K.

I may also feed any number of receiving stations through a series of branch wires such as 81 and 82 (Fig. 1). Each receiving station would comprise of course an arrangement similar to that disclosed hereinabove.

It should be noted that the device described may be adapted easily for a series of guns having different firing zones, each gun being provided as explained hereinabove with an electric stop such as 73.

As soon as the gun reaches the edge of its firing zone, without the distant control transmitter (which may simultaneously control other guns having a different firing zone) stopping, the contacts such as 75 and 76 break off the electric coupling 14 and the gun stops.

The contact 15 inserted in the feed circuit of the auxiliary motor and adapted to close when the winding 14 is live is open when the latter is not fed the automatic concordance restoring device is thus inoperative as the auxiliary motor S can no longer be fed.

On the contrary when the gun returns inside its firing zone, the coupling 14 is again operative and the switch 15 is closed.

Thus the gun is driven along with a sliding movement of the coupling of predetermined magnitude and the automatic concordance restoring device is set working again so as to compensate after a predetermined time the unavoidable shifting which has taken place at the moment of the restarting of the gun.

The above described device serves also as an automatic corrector for the heaving back. This is due to the fact that as shown on Fig. 1 the coupling 14 is in that part of the transmission which is between the circular and the nonreversible part of the transmission. Thus the heaving back will displace part 14' of the coupling with reference to part 14 whereby the rollers 29—30, 56—57, and 65—66 are displaced and the motor S is started and corrects automatically the error due to this heaving back.

It should be noted moreover that in certain cases the motor S used in the described example as an auxiliary motor may be used as a controlling motor actuating directly the gun or like part to be controlled.

In this latter case the motor, the reversing switch and auxiliary parts, would be chosen so as to give out the total power required for controlling the gun. Moreover the transmitting station would comprise only a group of transmitters such as 18, 19, 20.

In the modifications shown on Figs. 7 to 12, I have provided the following simplifications. The relay H is suppressed and the auxiliary motor S is controlled directly by the concordance-restoring apparatus, the speed of the auxiliary motor increasing with the angle between the direction of the sight glass and that of the gun. Moreover the aiming station being necessarily light and movable, the transmitter brushes are adapted to be controlled from a distance from the said aiming station. Thus the sight-glass may be disposed in a movable turret on the superstructure of the ship, and the transmitter itself underneath the ironclad deck.

This control of the transmitter brushes from a distance allows an easy aiming due to the continuous speed variation and to the change of direction without interruption of the current, in the distant control arrangement.

The aiming station may be controlled by a receiver controlled by the main transmitter and moving with the guns. Thereby the error in the aiming may be reduced to that due to the distance between the aiming station and the guns. The whole system may be used also in the case of a number of guns having each a different firing zone. The aiming station may on the other hand rotate by several revolutions and it is necessary to restore concordance in any case in the proper direction as soon as the sight glass reenters the firing zone of a given gun.

The guns must be adapted to be controlled by the receiving motor in all cases.

*a.*—With an automatic distant control device provided with an automatic concordance restoring device.

*b.*—With a merely supervised distant control device wherein concordance is restored through an auxiliary motor started at the receiver station according to the indications of a distant transmission controlled by the sight glass.

*c.*—With a distant transmission similar to that described in *b* wherein the indications received are transcribed in order to start the auxiliary motor.

*d.*—In the case of independent aiming, the guns being laid directly by means of the electric parts controlled from the receiving station.

In the modifications described hereinbelow a single receiving motor is thus used, in whatever manner the gun is to be controlled.

The transmitting station is removed from the aiming station as shown diagrammatically on Fig. 7. The transmitter $T_1$ controlled by the layer drives the receiver $R_1$ controlling the brushes of the main transmitter T. The latter actuates the controlled motor R controlling the gun P and the receiver $R_2$ controlling the sight glass of the transmitting station.

Fig. 8 shows a circle illustrating the angular movements of a gun the center of which is at O and on which the firing zone is shown at B. C. A. If the gun is supposed to move in the direction of the arrow $f$, it will come against the end of its firing zone at B where it must stop. On the other hand, the layer may continue moving his sight glass and transmitter $T_1$. When he comes to a point corresponding to A and continues rotating in the same direction, the gun must be put into concordance with the sight glass in the direction $f'$ so as to make the gun move against the direction of the sight glass.

This result is obtained through a reversing device controlled by the aiming station and causing a current reversal in the feed circuit of the concordance restoring arrangement each time the controlling transmitting station passes through the dead zone. Thus the auxiliary motor S and the gun are started moving in a direction opposed to that of the sight glass.

The gun is stopped at the limit of its firing zone through two stops. The first stop controlled by the receiver R stops the gun at the said limit whilst the aiming station may continue rotating outside the zone. This stop allows the gun to start again as soon as the sightglass is returned into the firing zone. Of course each gun may have a firing zone which is different as to position and to magnitude. The second or safety stop controlled by the gun itself is operative if the first one fails to work. It allows the gun to start in one direction or the other as soon as the aiming station is returned into the firing zone through one or the other of its limits.

To ensure the independence of the gun which may have to be set back into concordance by hand for instance in the case of damage to the electric connections of the automatic device, it is possible through the switch K to connect the auxiliary motor S either with the automatic concordance restoring device A or with the transformer V. In the latter case the control of the motor S is provided by hand from the receiving station. Moreover if the distant control device ceases working due for instance to a breaking of the wires connecting the transmitter T to the receiver R, the latter is disposed for feeding directly its rotor with one-phase current (Fig. 9), through a fourth ring 143 and one of the rings 108. The switch N allows the rotor to be connected either with the transmitter T or directly with the one phase mains. Thus in all cases, it is possible to control the gun through the receiver R, controlled in its turn either by the main distant control device or by the auxiliary motor S controlled automatically or by hand or by both means simultaneously. In all cases the single receiver R may be used.

The control of the auxiliary motor S is provided directly by the concordance restoring apparatus without any relay. The speed varies in a continuous manner and increases with the shifting between the transmitter and the receiver.

Figure 9A:
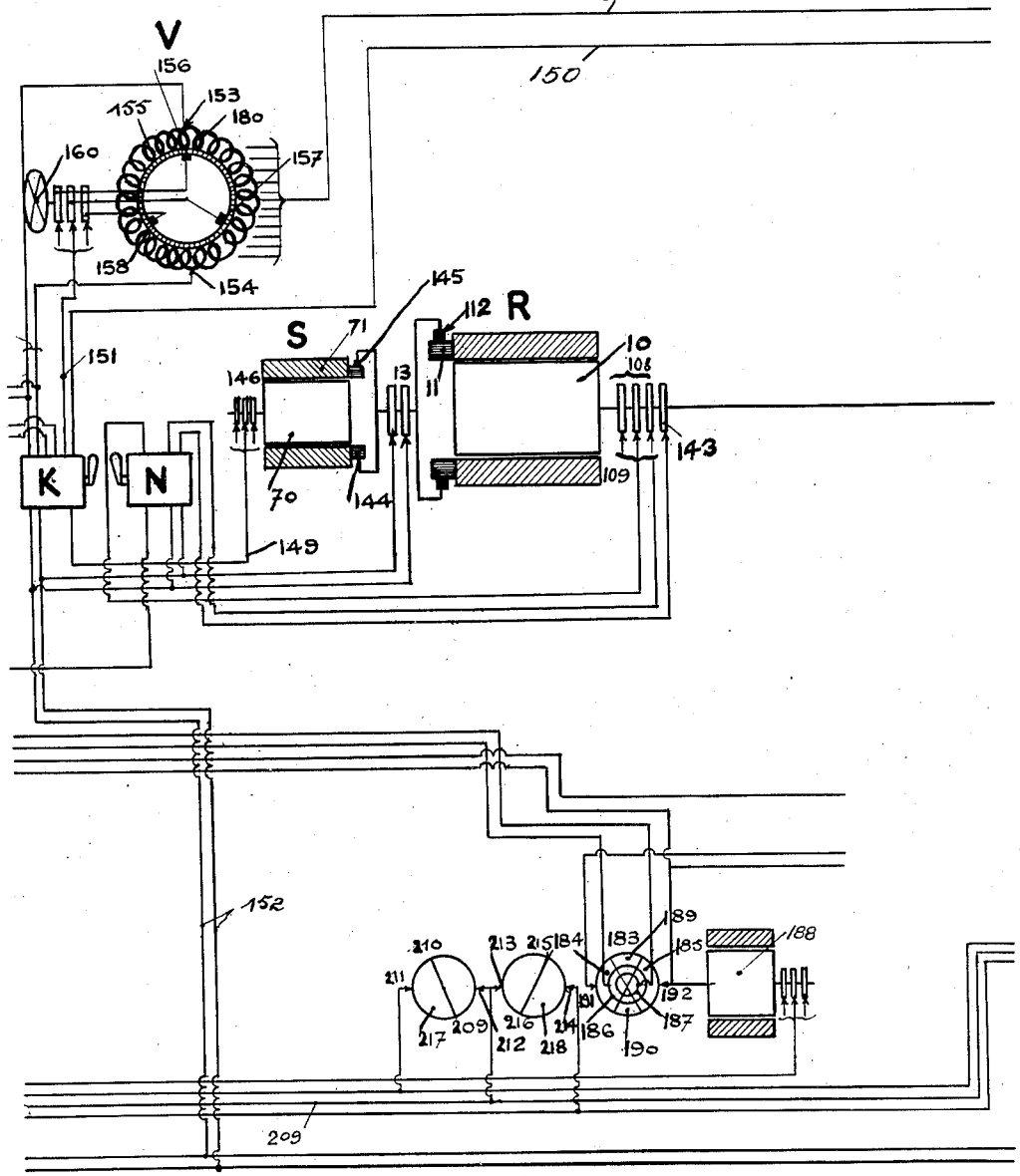

I will now proceed to explain the working of the modified arrangement shown in detail on Figs. 9, 9a and 9b. As explained the layer controls directly the main transmitter T through a handwheel 204, the transmitter $T_1$ and the receiver $R_1$. The motor T in its turn controls the motor $R_2$ which drives the sightglass through the pinions 130, 131 and 132. The sightglass controls through the pinions 127, 128 and 129 the auxiliary transmitter TA.

The motor $T_1$ may control the transmitter T through any suitable distant control device. For instance the rotor 133 of the receiver $R_1$ is fed through three equidistant points by the movable brushes 3 of the main transmitter T. Its stator 134 is fed through three points by the wires 135 which latter are connected with the movable armature of the transmitter $T_1$, the stator of which is fed with one-phase current.

The working is as follows:

Whenever the rotor of $T_1$ is moved by the hand wheel 204 the stator field of $R_1$ rotates whereby a torque arises in the latter receiver the rotor of which is fed through the brushes 3 of the main transmitter which cause an alternating flux of constant direction to arise. The torque makes the rotor rotate together with the brushes 3. The rotation of these brushes keeps thereby the shifting between the stator and rotor fields of the receiver $R_1$ constant. The movement continues therefore in a uniform manner with a speed depending on the original angle between the two fields as determined by the displacement of the rotor of the transmitter $T_1$. The speed increases therefore when the controlling wheel is further from its position of equilibrium in one direction or the other. This arrangement has the property that a torque arises between the stator and the rotor of the transmitter $T_1$. The effort for overcoming the resistance of the handwheel increases with the speed of the receiver $R_1$. Moreover when free, the handwheel 204 returns to its position of equilibrium. To prevent this automatic return of the handwheel and the torque to overcome when rotating it, the transmitter $T_1$ may be built like the transmitter T, the armature being stationary and a commutator being provided round which a set of three movable brushes control led by the handwheel 204 and feeding the stator 134 of the receiver R, are adapted to move.

The use of one of these devices provides a great ease of control due to the fact that the speed of the receiver $R_1$ depends on the angle of rotation of the inducing field, that is on the angle of rotation of the controlling handle of the transmitter $T_1$. On the other hand the increase of the speed, the stopping and the reversal of the direction of movement are provided without any breaking of the current through the mere movement of the movable brushes or of the rotor of the transmitter $T_1$.

As explained hereinabove the concordance restoring device A may without any relay, make the speed of the auxiliary motor S vary in a uniform manner. In view of this the distributors, instead of showing large conducting parts, comprise a commutator the blades of which are connected with suitable points of a transformer V, the auxiliary motor being fed directly through A.

Fig. 10 shows such a distributor comprising a commutator 161 divised into three by interposed insulating parts 162—163—164. Behind the commutator is a second distributor plate insulated on the greater part of its circumference except in front of the insulating parts 162—163—164 where are provided conducting parts 165—166—167 connected with three rings. Three rubbing parts 169 at 120° from each other move round this distributor and are connected with the three rings 172 (Fig. 9). The distributor of the receiver 23 comprises only the commutator 161, without a second plate.

Each commutator is fed through the wires 159 (Fig. 9) so as to distribute the voltages in a suitable manner through a transformer V the winding 180 of which is fed in two stationary points 153 and 154 by the conductors 152. This transformer comprising, if desired, one single winding provided with a commutator 155 over which the three brushes 156—157—158 driven by the control wheel 160 are adapted to move.

The brushes 156—157—158 may be connected with the rings 146 of the auxiliary motor S through the switch K when the device A is inoperative for direct control of the auxiliary motor. We will first suppose the switch K is in its automatic concordance restoring position for which the motor S is controlled by the device A.

The auxiliary motor S comprises a rotor 70 fed through the rings 146, the wires 149—150 and the distributors, 181, 182, 183 of the device A.

The stator 71 bears a commutator 144 round which two movable brushes 145 are adapted to move, said brushes being fed from the one-phase mains through the rings 13 common to the auxiliary motor and to the receiver R.

The working is as follows:

When the relative position between the rollers and the distributors is modified due to a shifting of the gun with reference to the sight-glass the rollers are displaced by an amount depending on the said shifting. The distributor 181 is the first to have its brushes or rollers moved. The modification of the distribution of the potentials under the rotating brushes 179 of this distributor causes a corresponding rotation of the field of the rotor 70 fed through the wires 149—150, the rubbing parts 169, the wires 185, the rubbing parts 178 and the wires 184 as in Fig. 1. After this the distributor 182 is operative when the set of brushes 178 has passed off the insulating segments of the distributor 182 and is no longer fed by the distributor 181. In the last stage the distributor 183 is operative. Thus the speed may vary in a continuous predetermined manner so as to start from a very small speed and to arrive for the distributor 183 at a speed of the auxiliary motor S as great as required.

The motor S works as follows: When the relative position between the rollers and the distributors is modified through a shifting between the gun and the aiming station, the field is shifted in the armature 70 of the auxiliary motor and a torque arises between the stator and the rotor which depends on the shifting. As soon as the motor rotates it drives its own brushes 145 which keep up the initial shifting provided by the device A. The speed remains constant and depends only on the angle of shifting. It will decrease with the latter and become zero when the sightglass is again in coincidence with the gun.

I may take into account at the receiver R the firing corrections due either to the speed of the object, or to the speed of the ship by means of the device A. This has the advantage that I act only on currents of small intensity. In view of this I use for A differential receivers as described in my former specification.

Fig. 11 shows diagrammatically by way of example a form of execution of such a device.

Each receiver 21, 22, 23 is provided with a field having a distributed winding 119, 120, 121. These fields, instead of being fed directly by the mains which would provide a stationary inducing field are fed through the transmitter TA₁ similar to TA and comprising three transmitters 122, 123, 124 feeding respectively the fields 119, 120, 121. When TA is operated the inducing field of each receiver 21, 22, 23 is rotated by an angle equal to the angle of rotation of the brushes of the corresponding transmitters 122, 123, 124.

The zero in the concordance restoring device is thus shifted by the same amount and the auxiliary motor S is started in the suitable direction for removing this angular difference. Thus the gun is rotated by a complementary amount corresponding to the desired corrections.

Fig. 12 shows a modification in the control of the main transmitter T of Fig. 9 whereby it is possible to act on the brushes 3 either through the receiver R₁ controlled by the aiming station or through another receiver R₃ controlled by another station.

The apparatuses of this second distant control device constituted by the transmitter T₃ and receiver R₃ may be similar to those of the control device T₁ R₁. In this case the wires 6 would feed also the rotor 190 of the receiver through a switch not shown on the drawings.

Fig. 12 shows a modification of this second control wherein the transmitter T₃ is identical with the transmitter T₁, the receiver R₃ comprising a stator 191 having a distributed winding and a rotor provided with a commutator round which two short circuited brushes are adapted to rub. The stator 196 of the transmitter T₃ is fed with one-phase current. As soon as the rotor 197 of the transmitter is rotated through the handwheel 198 the distribution of the potentials on the rings 195 is modified and consequently the stator field of the receiver R₃ is shifted, said receiver acting as a repulsion motor. A torque arises with the shifting of the stator field, the brushes 193 and 194 remaining stationary.

The speed increases moreover with the shifting and the direction of movement depends on the direction of the angular movement of the stator field and consequently on that of the handwheel 198.

The receivers R₁ R₃ may act one after the other or simultaneously on the transmitter T through the differential comprising the pinions 187 and 188 and the planet pinions borne by the ring 186 controlled by the pinion 189.

When the gun reaches the end of its firing zone, it is necessary to stop it which is provided by disconnecting it from the controlled motor R through the coupling 14 which is inoperative when the circuit of the current feeding it is broken. This is provided normally through the main stop B₁ controlled by the receiver R. However if it were to be inoperative for any reason whatever, the circuit would be broken by the auxiliary stop B₂ actuated by the carriage of the gun itself; this stop B₂ is adjusted so as to work a little after the stop B₁.

Means are provided for reconnecting the gun with the receiving motor, when the sight-glass has returned into the firing zone and to make it start either in the same direction as the sight glass or in the opposite direction if the latter has passed through the entire dead zone whilst the gun was disconnected.

When the gun is at the end of its firing zone, the movable nut 74 comes against contact 75 or 76 whereby the feed circuit of the coupling 14 is broken. The receiving motor R continues rotating, but the gun is not driven by it any more.

If the laying handwheel is rotated further in the same direction inside the firing zone of the gun the contact through the stop is restored and causes the coupling winding to be live and the concordance restoring device to start working. But the gun cannot be rotated in the same direction as the gun must be restored to concordance without passing out of the firing zone. Therefore the auxiliary motor must be rotated in the opposite direction. In view of this the reversing switch 183 provided with contacts 184 and 185 connected with the rings 188 and 187 is driven by the receiver 186 controlled by the slowest transmitter of the device T A. The reversing switch is also provided with the insulating segments 189 and 190 the angular width of which is smaller than that of the zone wherein the gun cannot fire.

On this reversing switch fed by the switch K rub two brushes 191 and 192 feeding the coupling 14 and the transformer V through the stops $B_1$ and $B_2$.

The reversing switch is adjusted in a manner such that the reversal of the current occurs when the sightglass passes through the middle of the angular dead zone of the gun. There may be if desired a breaking of the circuit of any desired duration before this reversal. The duration of this breaking depends on the angular width of the insulating parts the maximum value of which has been given hereinabove.

Thus, each time the sightglass passes through the dead zone, the feed current of the concordance restoring device is reversed. Therefore the making and breaking of the circuit are provided not by the switch but by the contact stops $B_1$ and $B_2$. This latter stop is constituted by two reversing switches 194 and 195 placed at each end of the firing zone and controlled by a movable projection 193 secured to the gun carriage. This stop is adjusted so as to work only after the stop $B_1$ which normally breaks the circuit of the current feeding the coupling and the concordance restoring device. In case the receiver passes out of step for any reason whatever, the stop $B_1$ is passed without the coupling current being interrupted and the safety stop $B_2$ is operative, the projection 193 controlling one of the two reversing switches 294 or 295. The action of the latter is as follows:

In the normal position which is that shown on the figure, the contacts 198, 199, 200, 201 are short-circuited. These contacts are in series with those of the main stop 75—76 which are normally to break the circuit of the coupling and of the concordance restoring device. If for the reasons given hereinabove this main stop, is inoperative the gun moves by a complementary amount and actuates the safety stop $B_2$ which for the direction of rotation $f$, for instance, controls the switch 195 so as to short circuit the contacts 202 and 203. At this moment, the contacts 200, 201 are open and break the circuit of the coupling winding, and of the concordance restoring device whereby the gun is stopped.

At this moment:

1°—Either the sightglass is moved in the direction $f'$ and returns into the firing zone.

2°—Or else it continues moving in the direction $f$ (dead zone).

In the first case, as the sightglass of the laying station moves in the direction $f'$, the gunman has to move the handwheel 204 in the corresponding direction $f'$. This short circuits the contacts 207—208 and closes the coupling through the wire 209, the contacts 208—207, 203—202, the coupling 14 and the wire 210. The coupling is thus operative and the gun returning in the direction $f'$ reenters its firing zone and actuates the reversing switch 295 which breaks the short circuit between the contacts 202 and 203 whereby the coupling winding is no longer live. At this moment, the contacts of the safety stop $B_2$ are returned to their normal position. The stop $B_1$ can again be operative through the working of the contacts 75 and 76; when the sightglass reenters the firing zone, the gun may be brought back into concordance with the sightglass and the stop $B_1$ is again ready to work.

In the second case where the sightglass continues rotating in the direction of the arrow $f_1$, when the sight glass passes towards the middle of the dead zone, the reversing switch 183 changes the direction of the current feeding the concordance restoring device but the current remains broken as the short circuit 200—201 has not been restored. The insulating discs 217 and 218 serve then to short circuit either the contacts 207—208 or 205—206 according to the case. These discs are secured to the shaft of the motor 188 and are provided at their periphery with contacts 209—210 for disc 217 and 215—216 for disc 218. A wire connects the contacts 209 and 210 and another wire connects the contacts 215 and 216. The position of these contacts is such with reference to the stationary brushes that the short circuit is provided after the current is reversed, as soon as the sight glass has nearly reentered the firing zone.

In the case considered where the gun rotates in the direction $f$, and when the sightglass continues moving in the same direction, the contacts 205 and 206 remain closed and the coupling 14 is inoperative.

As soon as the current reversal has been provided by the device 183, the concordance restoring device, when it starts working, provides a reversal of the feed current of the auxiliary motor S and causes the gun to rotate in the direction $f'$. The contacts 215 and 216 connected through a wire short circuit the contacts 213—214 that is the contacts 207—208 when the sight glass is nearly out of the dead zone. The gun is always at $c$, the sight glass being near $d$, in the dead zone. The short circuiting of 207—208 causes as in the preceding case, the coupling to be fed and the auxiliary motor to rotate in a direction opposed to that of the shifting of the gun with reference to the sightglass. The gun will therefore rotate in the direction $f'$ and pass through the arc $c\ g\ d$ towards the sightglass. This is done in two stages. The gun passes first beyond the point $c$ and closes thereby the switch 195 so as to short circuit the contacts 200—201 allowing the main stop to be operative. The contacts 202 and 203 are simultaneously opened, the concordance restoring device is no longer fed and the auxiliary motor S remains stationary. If at this moment, the sight glass is still in the dead zone, the gun remains stationary. As soon as the sightglass passes into the firing zone at $d$ in the direction $f_1$ the main stop $B_1$ restores the flow of current through the coupling and the concordance restoring device, this flow being reversed through the action of the switch 183. The concordance is thus restored through the firing zone in the reverse direction $f'$. When the concordance is restored no current passes any longer through the auxiliary motor S and the main distant control is alone operative.

The simultaneous use of the stops and of the switch 183 allows the gun whenever the sightglass passes out of the firing zone, to be moved in the opposite direction for a given position of the sightglass in the dead zone a little before it reenters the firing zone. The time for restoring concordance is thus brought to a minimum.

When the auxiliary motor S is started by hand, the reversing switch 183 is no longer of use. Similarly the main stop $B_1$ controlled by the receiver R should in some cases be suppressed, the only remaining stop being B.

The switch K is disposed so as to control the operativeness of the switch 183 and of the main stop $B_1$. The connections of K have been omitted from the figure for the sake of clearness.

When $B_2$ is alone operative, the gun being controlled by hand through the handle 160, a switch not shown allows the coupling to be excited through the short circuiting of the stops so as to allow the starting in the opposite direction when a stop has been reached.

If the concordance restoring device is not operative, the hand control of the handle 160 allows the desired shifting to be provided in the armature of the auxiliary motor S, through the wires 151 and 149, the switch K being set in a suitable position therefor.

Lastly if the distant control itself ceased working, that is if the rings 8 of the receiver were no longer fed by the main transmitter, the switch N allows one-phase current to be sent into the armature in order to make an alternating field arise as in the normal case of the feeding through three rings. This requires a complementary ring 143 cooperating with one of the normal rings 8.

When the voltage of the mains is different from that required by the rotor of the receiver R, the receiver may be fed through a transformer or the rotor may be provided with a second winding. In this latter case the receiver would be entirely independent and the gun would be controlled directly through the handle 160 so that the same receiver R may be used in all cases even when the distant control is not in working order.

What I claim is:

1. A self correcting distance electric control device comprising a controlling part actuating a main transmitter, receivers actuating controlled parts, correcting devices to restore when necessary the concordance between the controlling and controlled parts, consisting in a series of elementary transmitters controlled by the controlling part, rotating at different speeds which are each in a constant ratio with reference to that of said controlling part, for each controlled part a series of elementary receivers controlled by said elementary transmitters and actuating distributors; movable contacts in mechanical connection directly with the controlled part and adapted to move normally in unison with the corresponding distributors over which they rub; an auxiliary motor controlling the angular position of the inducing field in the receiver actuating said controlled part, means whereby whenever a lack of concordance arises between the distributors and the movable contacts the auxiliary motor is fed in such a manner that it causes a rotation of the inducing field which will restore the concordance.

2. A self correcting distance electric control device comprising a controlling part actuating a main transmitter, receivers actuating controlled parts, correcting devices to restore when necessary the concordance between the controlling and controlled parts consisting in a series of elementary transmitters controlled by the controlling part, rotating at different speeds which are each in a constant ratio with reference to that of said controlling part, for each controlled part a series of elementary receivers controlled by said elementary transmitters and actuating distributors; movable contacts in mechanical connection directly with the controlled part and adapted to move normally in unison with the corresponding distributors over which they rub; an auxiliary motor controlling the angular position of the inducing field in the receiver actuating said controlled part, means whereby whenever a lack of concordance arises between the distributor and the movable contacts said distributors act in succession from the slowest to the quickest to modify the feeding of the auxiliary motor in such manner that it causes a rotation of the inducing field which will restore the concordance.

3. A self correcting distance electric control device comprising a controlling part actuating a main transmitter, receivers actuating controlled parts, correcting devices to restore when necessary, the concordance between the controlling and controlled parts, consisting in a series of elementary transmitters controlled by the controlling part, rotating at different speeds which are each in a constant ratio with reference to that of said controlling part, for each controlled part a series of elementary receivers controlled by said elementary transmitters and actuating distributors; movable contacts in mechanical connection directly with the controlled part and adapted to move normally in unison with the corresponding distributors over which they rub; an auxiliary motor controlling the angular position of the inducing field in the receiver actuating said controlled part, a reversing switch actuated by the distributors acting in succession from the slowest to the quickest whenever a lack of concordance arises between the distributors and the movable contacts, said reversing switch modifying the feeding of the auxiliary motor and causing the latter to rotate in a direction such that the rotation of the inducing field will restore the concordance.

4. A distant control device comprising a main transmitter, a main receiver controlled thereby, a controlled part actuated by the main receiver, a series of elementary transmitters rotating at different speeds which are equal to half and to geometrically increasing multiples of half that of the main transmitter, a series of elementary receivers controlled respectively by one of the elementary transmitters, a distributor controlled by each elementary receiver, an auxiliary motor controlling the angular position of the inducing field of the main receiver and the feeding of which is controlled by the distributors, movable contacts in mechanical connection with the controlled part and adapted to move normally in unison with the corresponding distributors over which they rub, and means whereby the lack of concordance arising between the distributors and the movable contacts causes the several distributors in succession from the slowest to the quickest to modify the feeding of the auxiliary motor in a manner such that the rotation of the inducing field of the receiver will restore the concordance.

5. A distant control device comprising a main transmitter, a main receiver controlled thereby, a controlled part actuated by the main receiver, a series of elementary transmitters rotating at different speeds which are in a constant ratio with reference to that of the main transmitter, a series of elementary receivers controlled respectively by one of the elementary transmitters, a distributor controlled by each elementary receiver and comprising two juxtaposed rings having respectively two conducting parts insulated from each other by two narrow insulating blades and two narrow contacts opposite said blades separated by two insulating parts, the quickest moving distributor having only the former ring, an auxiliary motor controlling the angular position of the inducing field of the main receiver, movable contacts in mechanical connection with the controlled part and adapted to move normally in unison with the corresponding distributors over which they rub, a reversing switch adapted to feed the auxiliary motor, with current of either polarity, a relay controlling the reversing switch, wires connecting the relay with the conducting parts of each distributor and wires connecting the movable contacts of each distributor with the narrow contacts of the preceding slower moving distributor, the movable contacts of the slowest distributor being fed by the mains.

6. A distant control device comprising a main transmitter, a main receiver controlled thereby, a controlled part actuated by the main receiver, a series of elementary transmitters rotating at different speeds which are in a constant ratio with reference to that of the main transmitter, a series of elementary receivers controlled respectively by one of the elementary transmitters, a distributor controlled by each elementary receiver and comprising two juxtaposed rings having respectively two conducting parts insulated from each other by two narrow insulating blades and two narrow contacts opposite said blades separated by two insulating parts, the quickest moving distributor having only the former ring, an auxiliary motor controlling the angular position of the inducing field of the main receiver, movable contacts in mechanical connection with the controlled part and adapted to move normally in unison with the corresponding distributors over which they rub, a reversing switch adapted to feed the auxiliary motor, with current of either polarity, a relay controlling the reversing switch, wires connecting the relay with the conducting parts of each distributor, wires connecting the movable contacts of each distributor with the narrow contacts of the preceding slower moving distributor, the movable contacts of the slowest distributor being fed by the mains, an electromagnetic coupling between the main receiver and the controlled part and a switch controlling simultaneously the currents feeding the distant control device, the electromagnetic coupling, the relay and the movable contacts on the slowest distributor.

7. A distant control device comprising a main transmitter, a main receiver controlled thereby, a controlled part actuated by the main receiver, a series of elementary transmitters rotating at different speeds which are in a constant ratio with reference to that of the main transmitter, a series of elementary receivers controlled respectively by one of the elementary transmitters, a distributor controlled by each elementary receiver and comprising two juxtaposed rings having respectively two conducting parts insulated from each other by two narrow insulating blades and two narrow contacts opposite said blades separated by two insulating parts, the quickest moving distributor having only the former ring, an auxiliary motor controlling the angular position of the inducing field of the main receiver, movable contacts in mechanical connection with the controlled part and adapted to move normally in unison with the corresponding distributors over which they rub, a reversing switch adapted to feed the auxiliary motor with current of either polarity, a relay controlling the reversing switch, wires connecting the relay with the conducting parts of each distributor, wires connecting the movable contacts of each distributor with the narrow contacts of the preceding slower moving distributor, the movable contacts of the slowest distributor being fed by the mains, an electromagnetic coupling between the main receiver and the controlled part, a switch controlling simultaneously the currents feeding the distant control device, the electromagnetic coupling, the relay and the movable contacts on the slowest distributor, and stops controlled by the main receiver and adapted to break the current passing through the electromagnetic coupling between two given angular directions of the controlled part.

8. A distant control device comprising a main transmitter, a main receiver controlled thereby, a controlled part actuated by the main receiver, a series of elementary transmitters rotating at different speeds which are in a constant ratio with reference to that of the main transmitter, a series of elementary receivers controlled respectively by one of the elementary transmitters a distributor controlled by each elementary receiver and comprising two juxtaposed rings having respectively two conducting parts insulated from each other by two narrow insulating blades and two narrow contacts opposite said blades separated by two insulating parts, the quickest moving distributor having only the former ring, an auxiliary motor controlling the angular position of the inducing field of the main receiver, movable contacts in mechanical connection with the controlled part and adapted to move normally in unison with the corresponding distributors over which they rub, a reversing switch adapted to feed the auxiliary motor with current of either polarity, a relay controlling the reversing switch, wires connecting the relay with the conducting parts of each distributor, wires connecting the movable contacts of each distributor with the narrow contacts of the preceding slower moving distributor, the movable contacts of the slowest distributor being fed by the mains, resistances in the field and armature circuits of the electromagnet and means whereby the insertion of these resistances is provided by the action of the current passing out of the successive distributors from the quickest to the slowest towards the relay and causes a slowing down of the auxiliary motor.

9. A distant control device comprising a main transmitter, a main receiver controlled thereby, a controlled part actuated by the main receiver, a laying device controlling the transmitter from a distance, a series of elementary transmitters rotating at different speeds which are in a constant ratio with reference to that of the main transmitter, a series of elementary receivers controlled respectively by one of the elementary transmitters, a distributor controlled by each elementary receiver, an auxiliary motor controlling the angular position of the inducing field of the main receiver and the feeding of which is controlled by the distributors, movable contacts in mechanical connection with the controlled part and adapted to move normally in unison with the corresponding distributors over which they rub and means whereby the lack of concordance arising between the distributors and the movable contacts causes the several distributors in succession from the slowest to the quickest to modify the feeding of the auxiliary motor in a manner such that the rotation of the inducing field of the receiver will restore the concordance.

10. A distant control device comprising a main transmitter, a main receiver controlled thereby, a controlled part actuated by the main receiver, a series of elementary transmitters rotating at different speeds which are in a constant ratio with reference to that of the main transmitter, a series of elementary receivers controlled respectively by one of the elementary transmitters a distributor controlled by each elementary receiver and comprising two juxtaposed rings having respectively two conducting parts insulated from each other by two narrow insulating blades and two narrow contacts opposite said blades separated by two insulating parts, the slowest moving distributor having only the former ring, an auxiliary motor controlling the angular position of the inducing field of the main receiver, movable contacts in mechanical connection with the controlled part and adapted to move normally in unison with the corresponding distributors over which they rub, a reversing switch adapted to feed the auxiliary motor, with current of either polarity, a relay controlling the reversing switch, wires connecting the relay with the conducting parts of each distributor and wires connecting the movable contacts of each distributor with the narrow contacts of the preceding slower moving distributor, the movable contacts of the slowest distributor being fed by the mains, an electromagnetic coupling between the main receiver and the controlled part, a switch controlling simultaneously the currents feeding the distant control device, the electromagnetic coupling, the relay and the movable contacts on the slowest distributor, stops controlled by the main receiver and adapted to break the current passing through the electromagnetic coupling between two given angular directions of the controlled part, and a second couple of stops controlling electrically the electromagnetic coupling and controlled by the controlled part itself.

11. In a device as claimed in claim 2, a laying device controlling the transmitters, means for disconnecting the controlled part from the receivers, stops controlling said means at the limits of a given angular zone of movement of the laying device and a current reversing device adapted to reverse the current in the auxiliary motor whilst the laying device is passing through the dead zone between the said limits.

12. In a device as claimed in claim 2, means for controlling the controlled part independently of the main or auxiliary transmitters.

13. In a device as claimed in claim 2, the provision of means for shifting the zero potential in the field pieces of the main transmitter and receiver.

14. A distant control device comprising a main transmitter, a main receiver controlled thereby, a controlled part actuated by the main receiver, a series of elementary transmitters rotating at different speeds which are in a constant ratio with reference to that of the main transmitter, a series of elementary receivers controlled respectively by one of the elementary transmitters, a distributor controlled by each elementary receiver, an auxiliary motor controlling the angular position of the inducing field of the main receiver and the feeding of which is controlled by the distributors, movable contacts in mechanical connection with the controlled part and adapted to move normally in unison with the corresponding distributors over which they rub and means whereby the lack of concordance arising between the distributors and the movable contacts causes the several distributors in succession from the slowest to the quickest to modify the feeding of the auxiliary motor in a manner such that the rotation of the inducing field of the receiver will be provided, with a speed which increases with the angular shifting between the main transmitter and the controlled part, so as to restore the concordance.

In testimony whereof I have affixed my signature.

ELIE GRANAT.